United States Patent
Golaghazadeh et al.

(10) Patent No.: US 11,356,174 B1
(45) Date of Patent: Jun. 7, 2022

(54) ESTIMATING PERFORMANCE MARGIN OF A MULTI-SECTION PATH USING OPTICAL SIGNAL-TO-NOISE RATIO (OSNR)

(71) Applicant: Ciena Corporation, Hanover, MD (US)

(72) Inventors: Firouzeh Golaghazadeh, Ottawa (CA); Wentao Cui, Kanata (CA); Salim Tariq, Ottawa (CA); Petar Djukic, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/153,322

(22) Filed: Jan. 20, 2021

(51) Int. Cl.
*H04B 10/27* (2013.01)
*H04B 10/079* (2013.01)
*G06N 3/08* (2006.01)

(52) U.S. Cl.
CPC ......... *H04B 10/07953* (2013.01); *G06N 3/08* (2013.01); *H04B 10/27* (2013.01)

(58) Field of Classification Search
CPC H04B 10/27; H04B 10/564; H04B 10/07953; H04B 10/07955
See application file for complete search history.

(56) References Cited

U.S. PATENT DOCUMENTS

| | | | |
|---|---|---|---|
| 8,761,610 B2 | 6/2014 | Frankel | |
| 9,819,565 B2 | 11/2017 | Djukic et al. | |
| 9,871,582 B2 | 1/2018 | Djukic et al. | |
| 10,015,057 B2 | 7/2018 | Djukic et al. | |
| 10,148,578 B2 | 12/2018 | Morris et al. | |
| 2014/0029424 A1 | 1/2014 | Callard et al. | |
| 2014/0314405 A1* | 10/2014 | Zhang | H04B 10/07953 398/26 |
| 2017/0373750 A1* | 12/2017 | Pedro | H04B 10/0793 |

(Continued)

FOREIGN PATENT DOCUMENTS

| CA | 2 915 317 C | 11/2014 |
|---|---|---|
| CA | 2 916 413 A1 | 11/2014 |

(Continued)

OTHER PUBLICATIONS

Sandra Aladin et al., "Cognitive Tool for Estimating the QoT of New Lightpaths", Optical Society of America, OFC 2018 © OSA 2018, M3A.3.pdf, pp. 1-3.

(Continued)

*Primary Examiner* — Dzung D Tran
(74) *Attorney, Agent, or Firm* — Clements Bernard Baratta; Lawrence A. Baratta, Jr.; Christopher L. Bernard

(57) ABSTRACT

Systems, methods, and computer-executable programs are provided for estimating margin in a network path. A method, according to one implementation, includes the step of executing a section-based analysis by estimating a margin parameter for each section of a plurality of sections forming a path through a network. The margin parameter is related to at least an available Optical Signal-to-Noise Ratio (OSNR) parameter and a Required OSNR (ROSNR) parameter. The method further includes the step of combining the estimated margin parameters for the plurality of sections to obtain a section-based estimate. In response to determining that the section-based estimate falls outside an acceptable confidence range, the method includes executing an additional path-based analysis to modify the estimate of the margin parameter.

14 Claims, 7 Drawing Sheets

(56) References Cited

U.S. PATENT DOCUMENTS

| | | | | |
|---|---|---|---|---|
| 2019/0207701 A1* | 7/2019 | Ferreira Pedro | .... | H04J 14/0257 |
| 2019/0229844 A1 | 7/2019 | Coulombe et al. | | |
| 2019/0319735 A1* | 10/2019 | Mehrvar | ............ | H04J 14/0257 |
| 2021/0050915 A1* | 2/2021 | Lee | ......................... | H04L 45/28 |
| 2021/0314067 A1* | 10/2021 | Inui | ..................... | H04B 10/516 |

FOREIGN PATENT DOCUMENTS

| | | |
|---|---|---|
| CA | 2 914 740 A1 | 12/2014 |
| CA | 2 932 968 A1 | 6/2015 |
| CA | 2 939 662 A1 | 8/2015 |
| WO | 2011134305 A1 | 3/2011 |
| WO | 2011140851 A1 | 11/2011 |

OTHER PUBLICATIONS

Rui Manuel Morais et al., "Machine Learning Models for Estimating Quality of Transmission in DWDM Networks", Optical Society of America, D84 J. Opt. Commun. Netw./vol. 10, No. 10, Oct. 2018, pp. 1-16.

* cited by examiner

| FIBER TYPE | BASELINE | | DNN | | DNN GAIN OVER BASELINE |
|---|---|---|---|---|---|
| | MAE (dB) | STD. | MAE (dB) | STD. | |
| TWC | 0.63 | 0.81 | 0.08 | 0.14 | 87% |
| ELEAF | 0.29 | 0.32 | 0.05 | 0.07 | 83% |
| NDSF | 0.08 | 0.10 | 0.03 | 0.04 | 63% |
| Mixed Type | 0.18 | 0.30 | 0.05 | 0.08 | 72% |

| FIBER TYPE | BASELINE | DNN | DNN REDUCTION OVER BASELINE |
|---|---|---|---|
| TWC | 70% | 92% | 31% |
| ELEAF | 83% | 94% | 13% |
| NDSF | 93% | 94% | 1% |
| Mixed Type | 73% | 93% | 27% |

ESTIMATING PERFORMANCE MARGIN OF A MULTI-SECTION PATH USING OPTICAL SIGNAL-TO-NOISE RATIO (OSNR)

TECHNICAL FIELD

The present disclosure generally relates to networking systems and methods. More particularly, the present disclosure relates to estimating margin (or performance margin) using an available Optical Signal-to-Noise Ratio (OSNR) and a Required OSNR (ROSNR) along a network path having multiple Optical Multiplex Sections (OMSs).

BACKGROUND

Generally, network planners might consider a number of different factors when planning and deploying an optical communications network or when various pieces of networking equipment are incorporated into the optical communications network. One aspect in this planning process includes estimating a "margin" by using an available Optical Signal-to-Noise Ratio (OSNR) and a Required OSNR (ROSNR). The ROSNR may be related to a maximum Bit Error Rate (BER).

Before a wavelength or photonic service becomes operational, network planning and provisioning may include estimating the margin to determine if the service will have sufficient OSNR to satisfy any BER requirements that may be in effect. Normally, margin estimation in the planning process should be quick and accurate. Accuracy is to ensure that when services are activated, they satisfy their Quality of Service (QoS) requirements. The speed of the estimation directly impacts how long it takes to plan a network and evaluate different what-if scenarios. The number of planning scenarios grows rapidly in meshed networks when multi-cut protection is considered. In some cases, margin estimation may typically be one of the major bottlenecks in evaluating if a network has sufficient mesh protection capacity.

Traditionally, margin estimation has been performed by simulating non-linearities on an entire path of a wavelength or photonic service. During path simulation, optical non-linearities of each section (e.g., Optical Multiplex Section (OMS)) are simulated sequentially. This end-to-end process is fraught with problems due to the exponential number of potential paths in any given network. First, many paths, of course, will include overlapping or common sections, which means that the simulation may include needlessly computing the same common sections for each of the paths where they appear.

In the process of calculating margin, there are generally two main approaches common today. The first approach includes simulating the entire path from one end to the other. Another approach includes a section-based strategy that uses non-adaptive non-linear summation. Model-based approaches use a physical approximation known as the Gaussian Noise (GN)-model for non-linearities. One known physical approximation approach involving a GN-model is shown in R. M. Morais and J. Pedro, "Machine learning models for estimating quality of transmission in DWDM networks," in IEEE/OSA Journal of Optical Communications and Networking, vol. 10, no. 10, pp. D84-D99, October 2018, doi: 10.1364/JOCN.10.000D84. Another known physical approximation approach where the GN-model is approximated with a Deep Neural Network (DNN) is shown in S. Aladin and C. Tremblay, "Cognitive Tool for Estimating the QoT of New Lightpaths," 2018 Optical Fiber Communications Conference and Exposition (OFC), San Diego, Calif., 2018, pp. 1-3.

However, physical approximation approaches have an error that is typically not acceptable in practical scenarios. GN models do not consider all signal modulation formats. They work better in relatively high dispersion and uncompensated paths. Enhanced GN (EGN) models, which are a recent improvement on GN models, are configured to consider a signal modulation format, but still are limited to uncompensated path, especially with high dispersion. In addition, EGN models cannot adapt to constant envelope modulation formats, such as Quadrature Phase Shift Keying (QPSK) and 8-Dimentional (8D)-QPSK.

Problems may arise with the existing approaches because of their complexities and inaccuracies. The path-based approaches may not be tenable in some cases due to their complexity and can be replaced by a less-complex hop-by-hop approach. The conventional section-based approaches typically have relatively low accuracy, which causes many path-based simulations to be launched. Therefore, there is a need in the field of optical network planning to overcome the deficiencies of the conventional systems to quickly provide more accurate margin estimation.

BRIEF SUMMARY

According to one implementation of the present disclosure, a computing system includes a network interface in communication with a plurality of sections forming a path through a network. The computing system further includes a processing device in communication with the network interface and a memory device configured to store a computer program having instructions that, when executed, enable the processing device to execute certain functions. For example, the processing device, as enabled by the instructions, is configured to execute a section-based analysis by estimating a margin parameter for each section of the plurality of sections forming the path through the network. The margin parameter may be a factor of at least an available Optical Signal-to-Noise Ratio (OSNR) parameter and an estimated Required OSNR (ROSNR) parameter. The processing device is also configured to combine the estimated margin parameters for the plurality of sections to obtain a section-based estimate. Responsive to determining that the section-based estimate falls outside an acceptable confidence range, the processing device is configured to execute an additional path-based analysis to modify the estimate of the margin parameter of the path.

According to another implementation of the present disclosure, a non-transitory computer-readable medium may be configured to store an OSNR margin estimator having instructions that, when executed, enable a processing device to execute a section-based analysis by estimating a margin parameter for each section of a plurality of sections forming a path through a network. For example, the margin parameter may be a factor of at least an available OSNR parameter and an estimated ROSNR parameter. The instructions further enable the processing device to combine the estimated margin parameters for the plurality of sections to obtain a section-based estimate. Responsive to determining that the section-based estimate falls outside an acceptable confidence range, the processing device is further configured to execute an additional path-based analysis to modify the estimate of the margin parameter of the path.

According to yet another implementation of the present disclosure, a method includes the step of executing a section-based analysis by estimating a margin parameter for each section of a plurality of sections forming a path through a network, where the margin parameter is a factor of at least an available OSNR parameter and an estimated ROSNR parameter. The method also includes the step of combining the estimated margin parameters for the plurality of sections to obtain a section-based estimate. Responsive to determining that the section-based estimate falls outside an acceptable confidence range, the method also includes the step of executing an additional path-based analysis to modify the estimate of the margin parameter of the path.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

As mentioned above, estimating margin is generally a key part of network planning and provisioning. Margin estimation can be used to determine if various optical or photonic services will have sufficient Optical Signal-to-Noise Ratio (OSNR) properties to satisfy any Bit Error Rate (BER) constraints and Quality of Service (QoS) requirements. This margin estimation can be determined during a planning stage before an optical network is put into service. Again, the margin depends upon the OSNR and Required OSNR (ROSNR).

Traditionally, margin estimation has been performed by simulating non-linearities on an entire path of an optical network. During path simulation, optical non-linearities of each Optical Multiplex Section (OMS) are simulated sequentially. However, as mentioned above, this end-to-end process may lead to problems due to the very large number of possible paths in any given network, as described with respect to FIG. 1.

Figure 1:
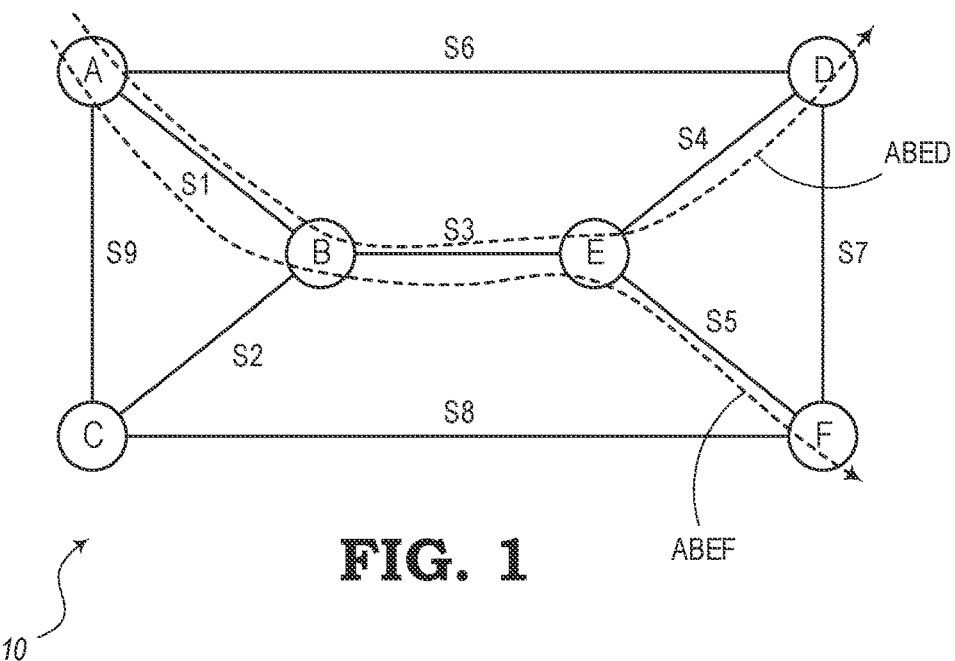
FIG. 1 is an example of a portion of a network showing multiple nodes and multiple sections or links between the nodes, according to various embodiments.

FIG. 1 is a diagram illustrating an example of a portion of a network 10 showing multiple nodes A, B, C, D, E, and F. The nodes A-F are configured in communication with each other, as shown in this example, via multiple links or sections (i.e., OMSs) S1, S2, S3, . . . , S9. It should be understood that many different paths will have common sections, whereby there will be an overlap over these common sections. For example, sections S1 and S3 in FIG. 1 are shared by path ABED and path ABEF. In some conventional systems, simulation may include needlessly computing these common or overlapping sections (e.g., S1, S3) for each possible path.

According to some of the embodiments of the present disclosure, at least two strategies may be used to estimate (or approximate) a margin parameter (e.g., performance margin) along various paths in the network 10. A first strategy is configured to be an improvement on section-based margin estimation processes where an estimate of the ROSNR is calculated from a weighted sum of non-linearities in each section S1-S9 and weights for each section S1-S9 may be calculated using a Deep Neural Network (DNN) model. A second strategy may be configured to combine section-based margin calculations with path-based margin calculations, while providing an improvement on both. This second strategy may be configured to achieve a mean absolute error of the margin parameter within about 0.1 dB of full path simulations. Compared to conventional systems, the strategies described in the present disclosure are capable of improving accuracy by about 60%-80% and reducing computational cost by at least 30%. Other benefits are described throughout the present disclosure.

As shown in FIG. 1, there are nine sections S1-S9 connecting the six nodes A-F in the network 10. Also, the network 10, as arranged in FIG. 1, include 129 different paths. Using conventional path-based estimation, the process would include repeatedly simulating a non-linearity of each section S1-S9 multiple times for a total of 453 section evaluations. Thus, this conventional path-based process is inefficient since it would need to store path simulation results of the complete network 10. Furthermore, these stored results in the convention system would be voided or invalidated with any changes in the configuration of the network 10. It would be difficult to reuse one path evaluation result towards other paths in this case. If the network configuration changes, the entire path evaluation in the conventional system would have to be repeated. These observations of conventional processes have led to a shift in focus to other processes that are directed to "section-based" margin estimation, which is implemented in some products.

One alternative solution to the "path-based" margin estimation is to use "section-based" margin estimation. In this respect, the non-linearity of each section S1-S9 is simulated once and then the results are re-used for each path that uses each respective section S1-S9. Section-based margin estimation is described in commonly-assigned U.S. Pat. No. 8,761,610, the contents of which are incorporated by reference herein. Section-based margin estimation relies on first simulating the non-linearity of each section independently, combining the non-linearities hop-by-hop on a path into a single estimate of path non-linearities and then determining the path margin. The section-based margin estimation reduces the amount of computation significantly. For example, referring again to FIG. 1, there would be nine unique section evaluations for the sections S1-S9 in the section-based approach, while there would be 453 section evaluations in the path-based approach. This is a computational reduction of up to 98% to just evaluate the path margins once (assuming section-based estimations are accurate). Inaccuracies in the estimations may cause further evaluations. However, it is expected that each path's margin may be queried multiple times if the network topology changes or if different what-if scenarios are run for network planning. If the accuracy of both methods is similar, it would clearly be advantageous to use section-based margin estimation.

Figure 2:
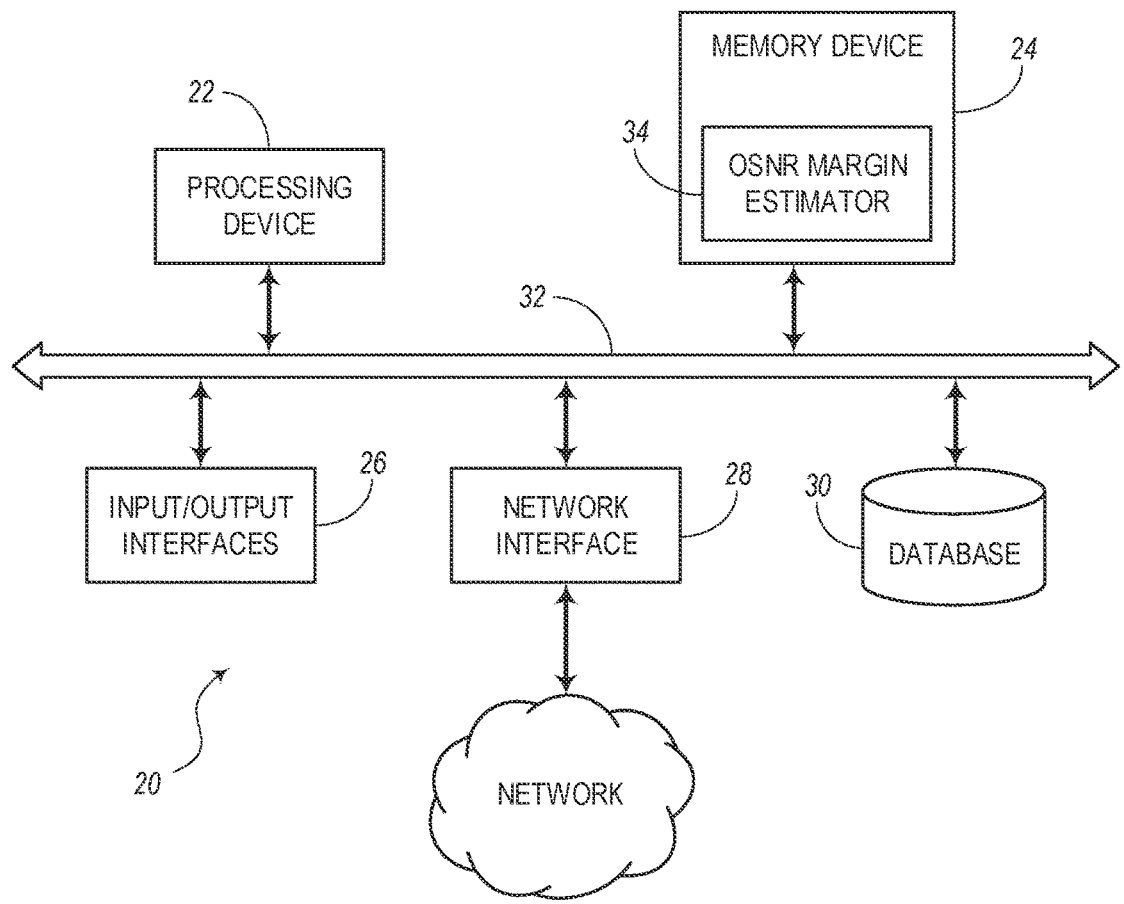
FIG. 2 is a block diagram illustrating a computing system configured to estimate a margin parameter with an available Optical Signal-to-Noise Ratio (OSNR) parameter and an estimated Required OSNR (ROSNR) parameter along a path through multiple sections in an optical network, according to various embodiments.

FIG. 2 is a block diagram illustrating an embodiment of a computing system 20 configured to estimate (or approximate) a margin parameter (e.g., performance margin) with an available (or actual) Optical Signal-to-Noise Ratio (OSNR) (or "OSNR parameter") and a Required OSNR (ROSNR) (e.g., an estimated and/or minimum "ROSNR parameter") along a path through multiple sections in an optical network (e.g., network 10 of FIG. 1). The estimated/approximated ROSNR may be calculated from the weighted sum of non-linearities in the sections of a network path. In the illustrated embodiment, the computing system 20 may be a digital computer that, in terms of hardware architecture, generally includes a processing device 22, a memory device 24, Input/Output (I/O) interfaces 26, a network interface 28, and a database 30. The memory device 24 may include a data store, database (e.g., database 30), or the like. It should be appreciated by those of ordinary skill in the art that FIG. 2 depicts the computing system 20 in a simplified manner, where practical embodiments may include additional components and suitably configured processing logic to support known or conventional operating features that are not described in detail herein. The components (i.e., 22, 24, 26, 28, 30) are communicatively coupled via a local interface 32. The local interface 32 may be, for example, but not limited to, one or more buses or other wired or wireless connections. The local interface 32 may have additional elements, which are omitted for simplicity, such as controllers, buffers, caches, drivers, repeaters, receivers, among other elements, to enable communications. Further, the local interface 32 may include address, control, and/or data connections to enable appropriate communications among the components 22, 24, 26, 28, 30.

The processing device 22 is a hardware device adapted for at least executing software instructions. The processing device 22 may be any custom made or commercially available processor, a Central Processing Unit (CPU), an auxiliary processor among several processors associated with the computing system 20, a semiconductor-based microprocessor (in the form of a microchip or chip set), or generally any device for executing software instructions. When the computing system 20 is in operation, the processing device 22 may be configured to execute software stored within the memory device 24, to communicate data to and from the memory device 24, and to generally control operations of the computing system 20 pursuant to the software instructions.

It will be appreciated that some embodiments of the processing device 22 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 22 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 26 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 28 may be used to enable the computing system 20 to communicate over a network (e.g., network 10), the Internet, a Wide Area Network (WAN), a Local Area Network (LAN), etc. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 10.

The memory device 24 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 24 may incorporate electronic, magnetic, optical, and/or other types of storage media. The memory device 24 may have a distributed architecture, where various components are situated remotely from one another, but can be accessed by the processing device 22. The software in memory device 24 may include one or more software programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 24 may include a data store used to store data. In one example, the data store may be located internal to the computing system 20 and may include, for example, an internal hard drive connected to the local interface 32 in the computing system 20. Additionally, in another embodiment, the data store may be located external to the computing system 20 and may include, for example, an external hard drive connected to the Input/Output (I/O) interfaces 26 (e.g., SCSI or USB connection). In a further embodiment, the data store may be connected to the computing system 20 through a network and may include, for example, a network attached file server.

Moreover, some embodiments may include a non-transitory computer-readable storage medium having computer readable code stored in the memory device 24 for programming the computing system 20 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 22 that, in response to such execution, cause the processing device 22 to perform a set of operations, steps, methods, processes, algorithms, functions, techniques, etc. as described herein for the various embodiments.

According to various embodiments, the computing system 20 may further include an OSNR margin estimator 34, which may be configured as a computer program or logic based in software or firmware. In other embodiments, the OSNR margin estimator 34 may be configured in hardware in the processing device 22 or any combination of hardware, software, and/or firmware. The OSNR margin estimator 34 is configured to enable the processing device 22 to estimate the margin (or performance margin) that depends upon the available OSNR and estimated ROSNR in one or more sections to obtain a path margin parameter in one or more paths in an optical communications network. For example, the OSNR margin estimator 34 may be configured to perform a procedure (or enable the execution of various steps) for estimating the margin parameter as described throughout the present disclosure. Two margin estimation strategies are described below. It should be noted that one of ordinary skill in the art may consider other strategies as will become evident from an understanding of the embodiments described in the present disclosure. These other strategies are meant to include alternative strategies that may be revealed or discovered according to the spirit and scope of the descriptions of embodiments in the present disclosure.

According to some embodiments, the computing system 20 includes the network interface 28 configured in communication with a plurality of sections forming a path through a network. The processing device 22 is configured in communication with the network interface 28. Also, the computing system 20 includes the memory device 24 configured to store a computer program (e.g., the OSNR margin estimator 34) having instructions that, when executed, enable the processing device 22 to execute a section-based analysis by estimating a margin parameter for each section of the plurality of sections forming the path through the network. The margin parameter is a factor of at least an available OSNR parameter and a ROSNR parameter. The instructions of the OSNR margin estimator 34 are further configured to enable the processing device 22 to combine the estimated margin parameters for the plurality of sections to obtain a section-based estimate. Responsive to determining that the section-based estimate falls outside an acceptable confidence range, the processing device 22 is configured to execute an additional path-based analysis by further estimating the margin parameter of the path or by modifying the first estimate of the margin parameter. The final result is a path margin parameter.

In addition, the computing system 20 may further be defined whereby the network interface 28 is configured to obtain measurements of non-linearities or configuration parameters and fiber properties of each section of the plurality of sections, forming the path through the network. For example, executing the section-based analysis includes utilizing the measured non-linearities of the plurality of sections to estimate the margin parameter for each section. Combining the estimated margin parameters may include applying a weight to each of the margin parameters and performing a summation function. The processing device 22 may be configured to use a Deep Neural Network (DNN) model or a Machine Learning (ML) regression model to calculate the weight associated with each of the plurality of sections. The processing device 22 may further be configured to calculate the weight associated with each section of the plurality of sections based on at least one of a path dispersion before and after a respective section, a configuration of a respective section, pre-calculated non-linearities, measured non-linearities, configuration parameters, fiber characteristics, modem type, spectral power, wavelength characteristics, and spectrum shape.

Furthermore, according to additional embodiments, the sections described above may be Optical Multiplex Sections (OMSs). Also, estimating the margin parameter may depend upon an available (or actual) OSNR parameter and estimating an ROSNR parameter. Estimating the margin parameter may further include subtracting a path penalty from the difference between OSNR and ROSNR. For example, the path penalty may be a factor of one or more of filter characteristics, Polarization Dependent Loss (PDL), and Polarization Mode Dispersion (PMD). Path penalties can be determined relatively quickly and therefore do not consume a significant amount of time or resources. Also, the minimum estimated ROSNR parameter may be based on one or more of a maximum Bit Error Rate (BER) parameter and a Quality of Service (QoS) parameter. One or both of the section-based analysis and the path-based analysis may include the use of a Deep Neural Network (DNN) model.

I. First Margin Estimation Approach—Based on Sections Only

The first approach includes evaluating a path's margin by combining non-linearities of sections (e.g., S1-S9) in a hop-by-hop fashion. In some embodiments, the OSNR margin estimator 34 may be configured to utilize a Deep Neural Network (DNN) model, Machine Learning (ML) regression model, or other suitable ML models, techniques, or algorithms. Multiple ways of utilizing DNN are described herein and/or may be considered based on an understanding of the present disclosure. For example, path margin can be estimated from a weighted sum of non-linearities in each section, where the weights for each section are calculated using DNN.

The margin M of a path (in dB) is given as follows:

$$M = OSNR - ROSNR - penalty$$

where penalty is the path penalty due to filter, Polarization Dependent Loss (PDL), Polarization Mode Dispersion (PMD), etc. The penalty (or path penalty) can be determined relatively quickly.

ROSNR is calculated as a function of back-to-back ROSNR and non-linear optical noise to signal ratio ($NSR_{nl}$). Note that "back-to-back" may be defined as no propagation over fiber, therefore no propagation non-linearity is cumulated.

$$ROSNR = f(ROSNR_{b2b}, NSR_{nl})$$

The non-linearity term $NSR_{nl}$ is typically unknown and needs to be estimated. In one embodiment of the section-based approach, path non-linearity $NSR_{nl}$ may be approximated as a weighted sum of the section non-linearity that this path goes through:

$$NSR_{nl}^{1:N} \approx \sum_{n=2}^{N} w_{n-1:n} NSR_{nl}^{n-1:n}$$

where, in a path with section node 1 through N, NSRni the section non-linearity for nodes n−1 to n, and $w_{n-1:n}$ is the corresponding weight of the section.

Figure 3:
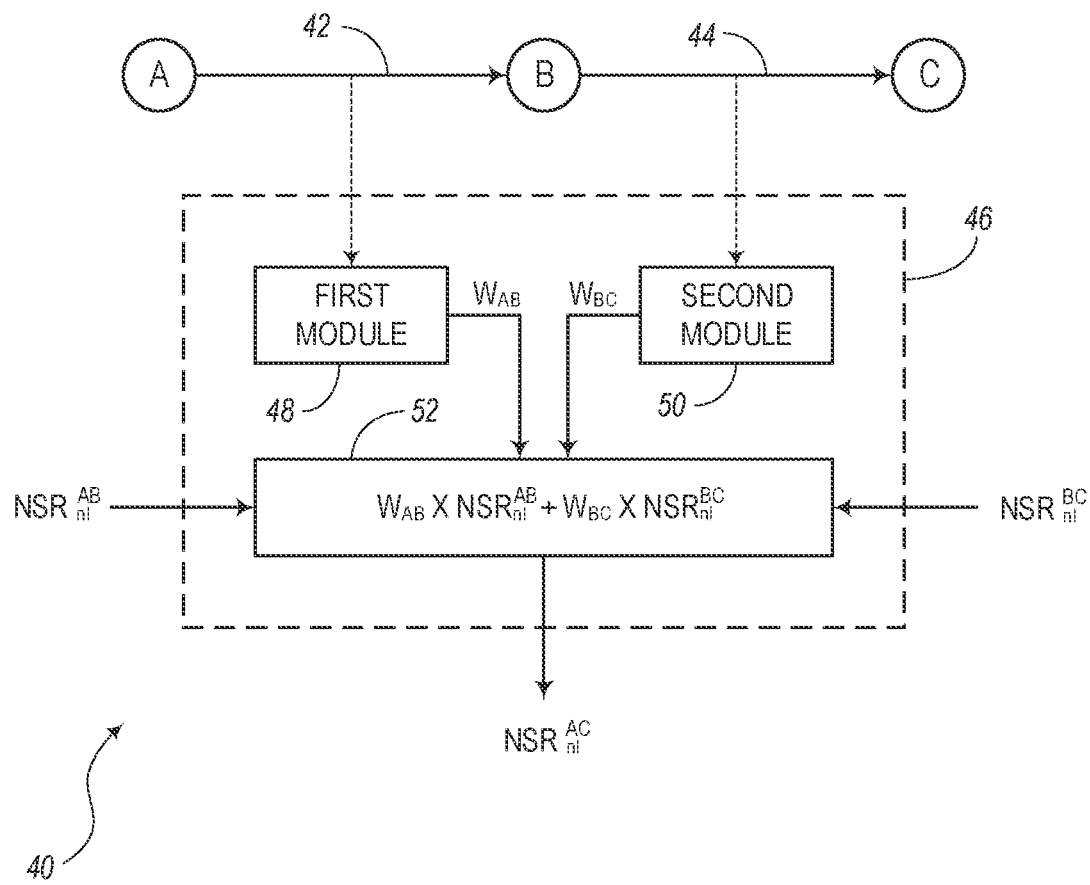
FIG. 3 is a diagram illustrating a section-based estimation procedure for estimating non-linear characteristics of a two-section path through a network, according to various embodiments.

FIG. 3 is a diagram illustrating an embodiment of a section-based estimation procedure 40 for estimating non-linear characteristics of a two-section path through a network. In this embodiment, a small portion of a network includes nodes A, B, and C, which form a path ABC. Nodes A and B are connected via a first section 42 and nodes B and C are connected via a second section 44. The "weight" of each section (e.g., sections 42, 44) in the context of a path (e.g., path ABC) depends on at least 1) the path dispersion before and after each section, and 2) each section's configuration, including pre-calculated section non-linearity, fiber characteristics, modem types, power, wavelength plan, spectrum shape, etc. These parameters may be used as inputs to enable the OSNR margin estimator 34 to formulate the estimation of the weights into a Machine Learning (ML) regression task.

As an alternative to the above formulation of the non-linear Noise-to-Signal Ratio term NSRnr, the section-based approach can be generalized to a more generic approximation:

$$NSR^{1:N}_{nl} \approx h(\{NSR^{n-1:n}_{nl}, v^{n-1:n}\}_{n=2}^{N})$$

where the approximation is not limited to a weighted sum format. Instead of generating section-wise weights, a parametrized function (h) may directly output path non-linearity. The input feature vector is represented by $v^{n-1:n}$ in addition to section non-linearity $NSR^{n-1:n}_{nl}$. In either case, the OSNR margin estimator 34 may be configured to utilize DNNs to estimate the non-linearities.

The section-based estimation procedure 40 may include a path non-linearity estimator 46 that outputs the non-linearity of the path ABC. According to some embodiments, the section-based estimation procedure 40 may include a first module 48 associated with the first section 42 between nodes A and B and a second module 50 associated with the second section 44 between nodes B and C. It should be evident that modules 48 and 50 could in fact be one DNN module and that the calculation in FIG. 3 can be done by calling the same module twice with different parameters for section 42 and section 44. The modules 48, 50 may be configured as DNN models for receiving parameters of their respective sections 42, 44, and producing a section non-linearity calculation or estimation. Weights (e.g., $W_{AB}$, $W_{BC}$) associated with the different sections 42, 44 are the output of the modules 48, 50, respectively. An aggregator 52 is configured to provide an output of the path non-linearity estimator 46 based on the weights and section non-linearities.

Figure 4:
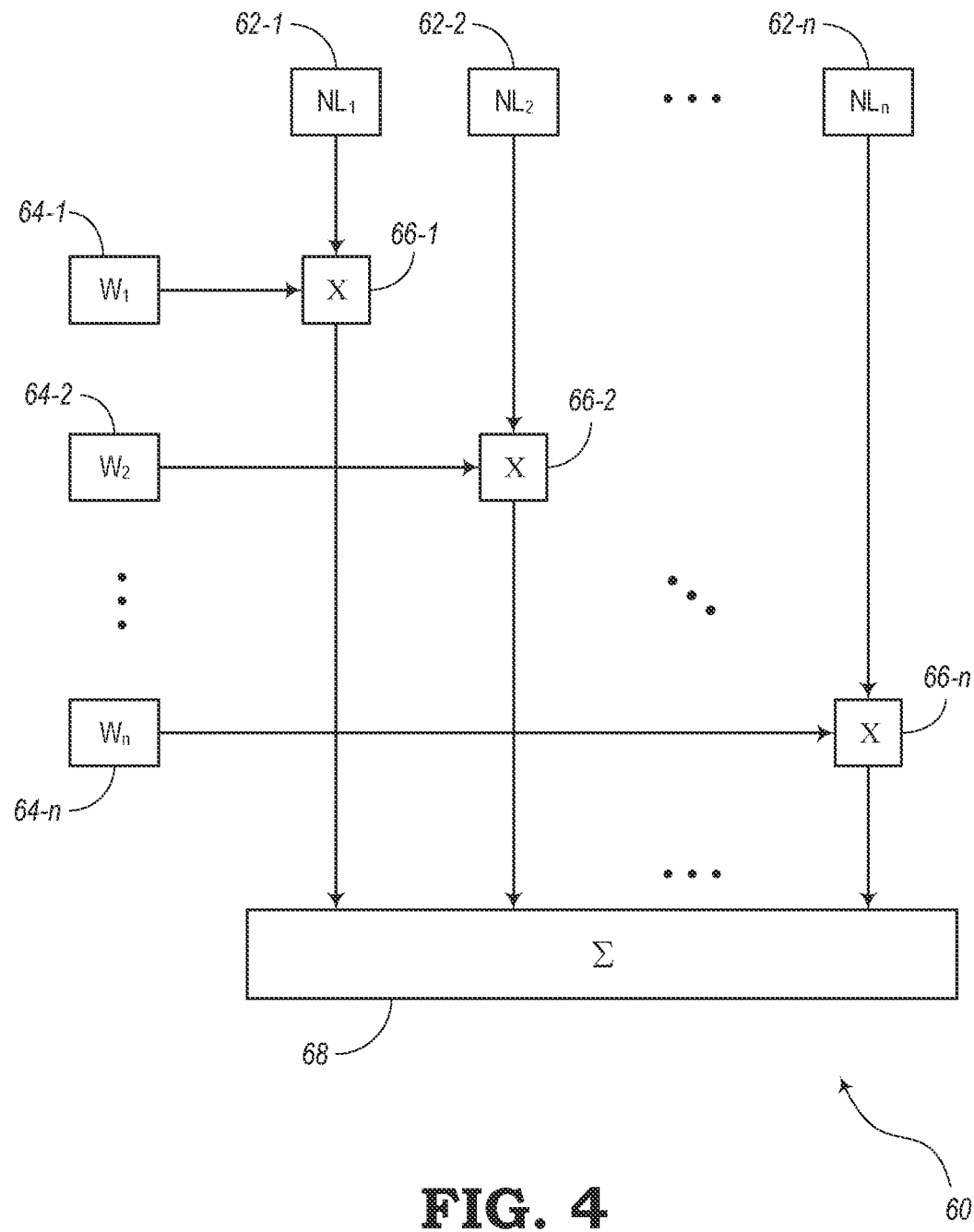
FIG. 4 is a diagram illustrating an arrangement for estimating margin of a path through a network having a plurality of Optical Multiplex Sections (OMSs), according to various embodiments.

FIG. 4 is a diagram illustrating an arrangement 60 for estimating margin (or performance margin) of a path through a network having a plurality of Optical Multiplex Sections (OMSs). In this embodiment, the arrangement 60 includes a plurality of non-linearity modules 62-1, 62-2, . . . , 62-n, representing the calculated non-linearity of each of the n sections of a path in a network. Each non-linearity module 62 is associated with one of a plurality of weight modules 64-1, 64-2, . . . , 64-n. Each weight module 64 includes a weighting factor used for a respective section, based on various characteristics of the respective section and the path as a whole. The non-linearity modules 62-1, 62-2, . . . , 62-n are respectively matched with the weight module 64-1, 64-2, . . . , 64-n and multiplied or otherwise combined using a plurality of combiners 66-1, 66-2, . . . , 66-n. The outputs from the combiners 66 are supplied to a summing module 68, which is configured to add the products of the non-linearities and weights of each section in the path. As configured in this arrangement 60, it is possible to determine the path margin for any path having any number (n) of sections.

Determining Weights with a DNN

Weights $w_{n-1:n}$, as used in conventional processes, can be obtained by simulating non-linearities on a path. However, this may not be useful in some respects, as the computational benefits of a hop-by-hop approach would normally be lost. The weights could also be constant (i.e., set to 1) in some cases, but it has been discovered that this approach may result in low accuracy. Instead, according to various embodiments of the present disclosure, it may be beneficial to simulate a wide range of diverse path scenarios, tabulate the conditions on a path (each involving a section of the path), and connect these conditions with the corresponding weights, as described with respect to the embodiments shown in FIGS. 3 and 4. In some embodiments, it may be possible to use a table in a regression to create a parametrized function that can approximate the weights in path conditions not in the table.

To ensure wide applicability of the parametrized function, the simulated path scenarios can cover a wide range of applications of optical line systems from different vendors. The varied parameters of a path and section may include, for example: modem type, modulation type, fiber type, span length, span loss, transmitter dispersion pre-compensation, power provisioning, spectrum tilt, probe frequency, channel spacing, interference signal type, existence of Optical Service Channel (OSC), section span number, etc. Variation of each parameter lies in the typical range of real-world deployments. When varying these parameters, all link budget rules (e.g., dispersion limit, filter count limit, non-linearity limit, etc.) are all respected to represent realistic simulation.

One way of parametrizing regression is to use a DNN. Other regression methods (e.g., polynomial, linear regression, etc.) can also be used. However, it has been found that the accuracy of polynomial and linear regression appears to be inferior to the accuracy of the DNN approach. There may be multiple ways to implement a DNN (e.g., by utilizing a multi-layer perceptron, a series of matrix multiplications (dense layers), convolutional networks, etc.) and may be implemented with various output layers, such as Rectified Linear Units (ReLUs), tanh units or others. There are many ways to implement DNNs including using an end-to-end open-source ML platform, (e.g., TensorFlow, etc.).

For example, a three-layer network could be implemented with a parametrized function using the following set of matrix/vector operations:

$$\hat{w} = W_3 \max\{0, W_2 \max\{0, W_1 x + b_1\} + b_2\} + b_3$$

where x is a vector of inputs describing the required section and path parameters, and w is the estimated section weight. Matrices $W_1$, $W_2$, $W_3$ and vectors $b_1$, $b_2$, $b_3$ are the parameters to be learned during a training stage of a DNN or ML process.

The parameters of the DNN may be learned during training using the simulated or measured non-linearity data which is stored in a table. Each row in the table may contain a vector of a section and a path parameter (represented by x). To be detailed, feature vector x may be a concatenation of the above-mentioned varied parameters during simulation data generation, or from network measurements. The rows of the table are fed to the network and back-propagation is used to calculate derivatives and converge to the optimum set of parameters for the table.

The trained DNN may be used with respect to the OSNR margin estimator 34 shown in FIG. 2, the section-based estimation procedure 40 of FIG. 3, and/or the path non-linearity estimator 46 shown in FIG. 3. In this case, the estimator may use an algorithm for calculating the non-linearity on a path, which may be implemented, for example, in planning software as a library or as a micro-service. The software may track the network and may be made aware of its topology and path configuration. From this information, the software may be configured to determine the equipment and fibers traversed by a path. Given a path, each section's feature vector x containing the information about the section configuration is retrieved. The algorithm may be fed with x and the precomputed, or measured, non-linearity for the section. The estimator may use x as an input to the DNN to calculate section-wise non-linearity on the path and calculates the end-to-end path non-linearity and margin.

The generalization performance of this approach has been observed experimentally. Training data used to obtain a good DNN is separate from any testing dataset. The training data for the DNN is obtained by simulating segments with given properties. On the other hand, the testing data, which was used to evaluate the algorithm, is from an actual network where segments have properties in a similar range as the simulated segments, but not exactly the same. The training data also used end-to-end path margin evaluations, which were used to compare to the output of the estimation algorithm. The DNN was trained with section data only. Both the input and output data of the algorithm were obtained in different ways during training and testing. The testing data closely corresponded to actual use. As described in the following, the test results were all from networks that the DNN never experienced during training.

II. Second Margin Estimation Approach—Based on Sections and Paths

As described above, the first margin estimation approach includes analysis of sections (e.g., OMSs) only. In this portion of the present disclosure, not only are sections analyzed, but also the entire path is analyzed as well. This hybrid approach can be used as a fail-safe mechanism for margin estimation. This second technique or algorithm described in present disclosure combines section-based and path-based margin estimation approaches. As the estimates using the section-based approach may include unacceptable errors, the second algorithm may be configured to combine section-based algorithms with path-based simulation.

Figure 5:
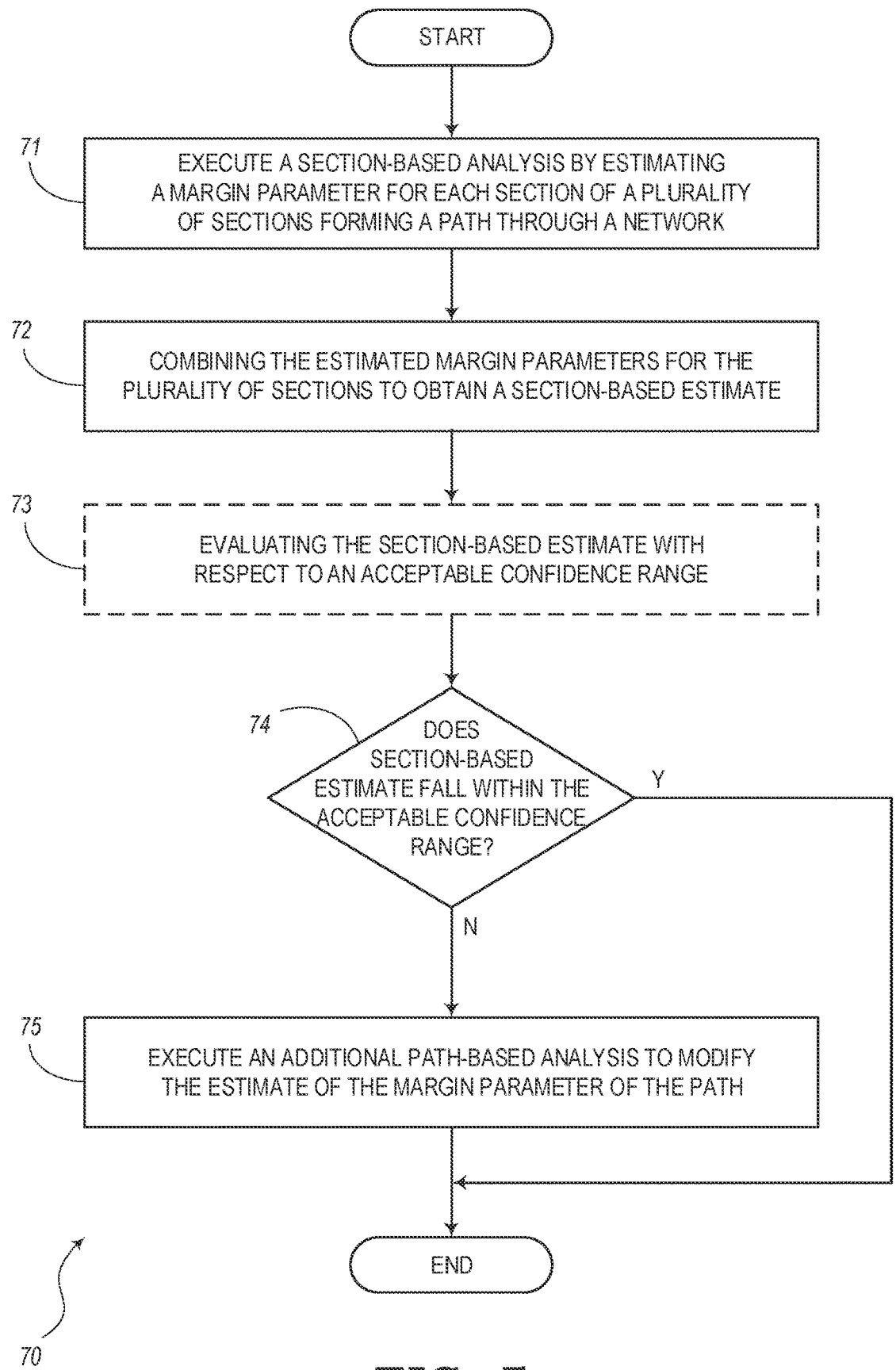
FIG. 5 is a block diagram illustrating a general process for estimating margin in a path through a network, according to various embodiments.

FIG. 5 is a block diagram illustrating an embodiment of a process 70 for estimating margin in a path through a network. In this embodiment, the process 70 includes executing a section-based analysis by estimating a margin parameter for each section of a plurality of sections forming the path through the network, as indicated in block 71. For example, the margin parameter may be a factor of at least an available Optical Signal-to-Noise Ratio (OSNR) parameter and a Required OSNR (ROSNR) parameter (e.g., minimum estimated ROSNR). The process 70 further includes the step of combining the estimated margin parameters for the plurality of sections to obtain a section-based estimate, as indicated in block 72. Also, the process 70 includes the step of evaluating the section-based estimate with respect to an acceptable confidence range, as indicated in block 73. In decision diamond 74, the process 70 includes determining whether or not the section-based estimate falls within the acceptable confidence range. If so, this section-based estimate is considered to be sufficient and the process 70 ends. However, if it is determined in decision diamond 74 that the section-based estimate falls outside the acceptable confidence range, then the process 70 goes to block 75, which includes the step of executing an additional path-based analysis (e.g., a standard path-based estimation) to modify the estimate of the margin parameter of the path (or for further estimating the margin parameter).

The process 70 may further be defined whereby a network interface (e.g., network interface 28) is configured to obtain measurements of non-linearities of each section of the plurality of sections forming the path through the network. For example, executing the section-based analysis (block 71) may include utilizing the measured non-linearities of the plurality of sections to estimate the margin parameter for each section. Combining the estimated margin parameters (block 72) may further include applying a weight to each of the measured non-linearities and performing a summation function. The process 70 may be configured to enable the processing device to use a Deep Neural Network (DNN) model or a Machine Learning (ML) regression model to calculate the weight associated with each of the plurality of sections. The weight associated with each section of the plurality of sections may be calculated based on at least one of a path dispersion before and after a respective section, a configuration of a respective section, pre-calculated non-linearities, fiber characteristics, modem type, spectral power, wavelength characteristics, and spectrum shape.

The sections described above may be Optical Multiplex Sections (OMSs). Also, estimating the margin parameter (block 71) may include determining a difference between the available OSNR parameter and the ROSNR parameter. Estimating the margin parameter (block 71) may also include subtracting a path penalty from the difference, where the path penalty may be any factor of one or more of filter characteristics, Polarization Dependent Loss (PDL), and Polarization Mode Dispersion (PMD). An estimate of the ROSNR parameter may be calculated based on one or more of a maximum Bit Error Rate (BER) parameter and a Quality of Service (QoS) parameter. The process 70 may further be defined whereby one or more of the section-based analysis (block 71) and the path-based analysis (block 75) may include the use of a Deep Neural Network (DNN) model.

Figure 6:
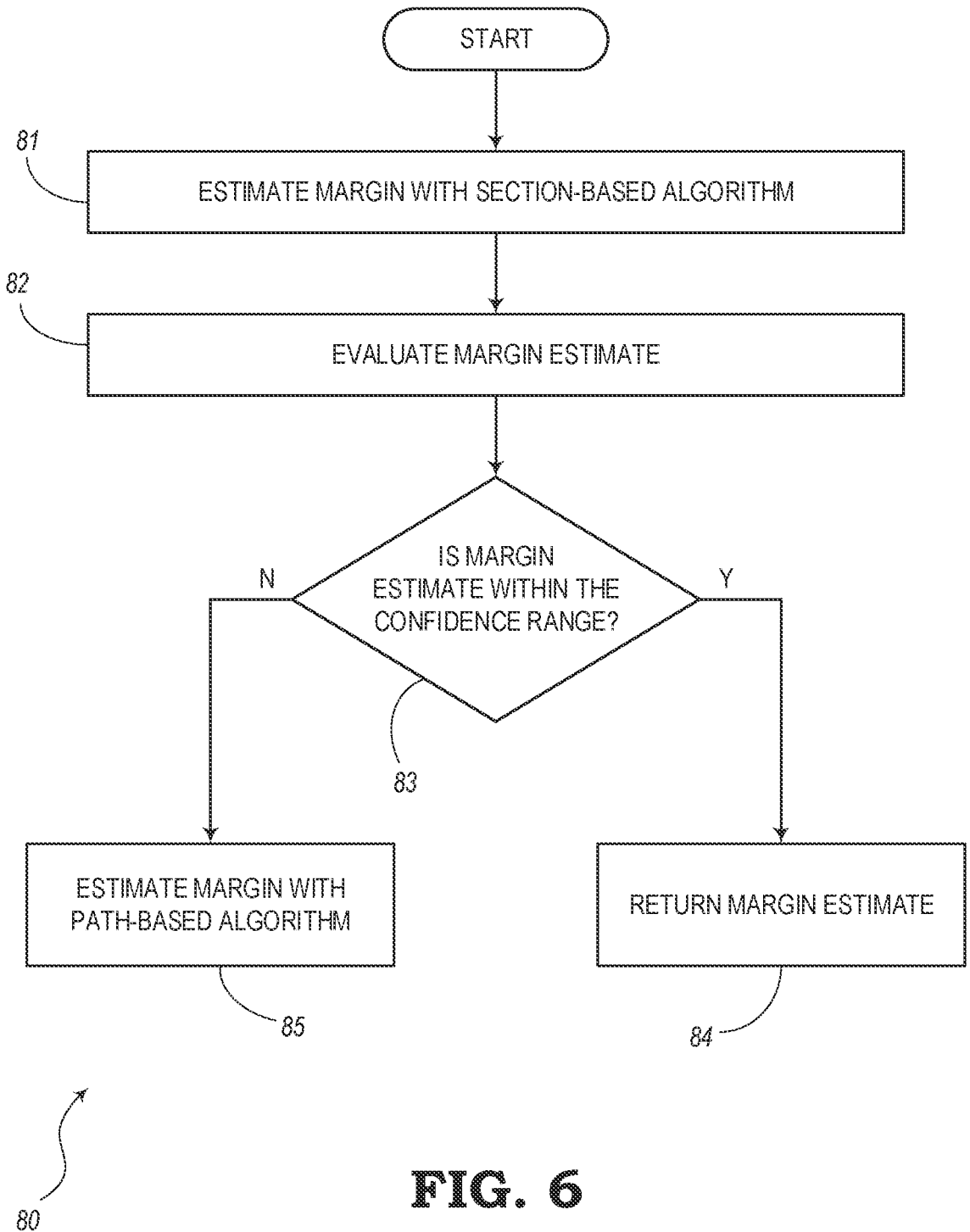
FIG. 6 is a flow diagram illustrating another general process for estimating margin through a network path, according to various embodiments.

FIG. 6 is a flow diagram illustrating an embodiment of a process 80 using a confidence evaluation by determining whether a section-based analysis is sufficient and further utilizing an additional path-based algorithm, if necessary, if the section-based analysis needs refinement. In this general method, the process 80 is configured to estimate margin through a network path while also analyzing the confidence in the section-based algorithm. For example, the process 80 includes estimating margin with an available OSNR and an estimated ROSNR of a path in an optical network using a section-based algorithm, as indicated in block 81. The process 80 further includes evaluating the margin estimate, as indicated in block 82. Next, the process 80 includes determining if the section-based margin estimate is within a predetermined confidence range, as indicated in decision diamond 83. If there is confidence in the section-based margin estimate by itself (i.e., the margin estimate is within the predetermined confidence range), then the process 80 proceeds to block 84, which includes the step of returning this margin estimate. However, if there is insufficient confidence in the section-based margin estimate alone, then the process 80 goes to block 85. As indicated in block 85, the process 80 includes the step of further estimating the margin with a path-based algorithm (which may include modifying the section-based margin estimate). Block 85 may further include combining the results of the section-based estimation with the results of the path-based estimation using any suitable aggregation technique.

Therefore, after the section-based algorithm estimates the margin, the processes 70, 80 (e.g., which may be associated with the OSNR margin estimator 34 shown in FIG. 2) may be configured to check how confident it is in its estimate. If the algorithm is not confident, it invokes the path-based algorithm to perform margin calculation using a different approach. The section-based estimation can be performed with the algorithm specified above with respect to embodiments of FIG. 3 or 4, or with any other suitable algorithm that may be known or developed in the future.

There may be multiple ways of checking the confidence of the section-based estimator. For example, one way to determine confidence may include looking at the range of input values to the section-based algorithm and the range of values of the output. Given a predetermined confident range of input and output values for an algorithm, the evaluation of the margin estimate proceeds by using a threshold or some other method that can divide a set of values into two non-overlapping sets (e.g., classification with machine learning).

The confident range of values can be established in any of multiple ways. For example, one way may include comparing the estimated margin values with actual margin values on the path from a dedicated self-assessment dataset. The self-assessment dataset may be created to test the DNN model confidence systematically. Similar to a training table, the self-assessment data may be configured to cover a wide range of scenarios supported by link budget tools. The self-assessment may be configured to record the range of configurations and estimations, whereby a DNN model may incorrectly pass or fail a path. Such a range may be called an uncertain range. At inference time, any configuration and estimation in the uncertain range will be considered with low confidence level and invoke the path-based simulation.

Another way to determine the confidence when a DNN is used to estimate non-linearities is by using a Bayesian approach, where the DNN outputs the confidence it has in the estimate. In general, the Bayesian confidence that the DNN will have in its estimate may be configured to get better with the number of times it has seen a similar example. According to some embodiments of the present disclosure, the confidence estimation, which may include features that are a standard part of the current TensorFlow library, may be utilized in a manner that would be understood by one of ordinary skill in the art.

Accordingly, there are at least two key aspects of the present disclosure. First of all, an algorithm (e.g., the process 70 of FIG. 5 or process 80 of FIG. 6) may use confidence bounds or a confidence range to switch between path-based simulation and section-based estimates. The processes 70, 80 may combine two margin estimation algorithms, the first being a section-based (or link-based) estimation (e.g., blocks 71, 81) and the second being a path-based estimation (e.g., blocks 75, 85) with switching logic (e.g., blocks 73 and 74 of FIG. 5 or blocks 82 and 83 of FIG. 6). The section-based estimation (e.g., blocks 71, 81) on its own may be known in conventional systems as one independent process. Also, the path-based estimation (e.g., blocks 75, 85) on it own may also be known in conventional systems as another independent process. However, the present disclosure introduces a strategy where these two processes are combined into one process. In particular, the present disclosure includes determining whether there is sufficient confidence in the section-based margin estimation alone.

Another key aspect of the present disclosure is that an algorithm can be used that relies on pre-calculated section non-linearities and combines these into path non-linearities with a DNN. This algorithm may be a specific implementation of the section-based margin estimation described with respect to block 71 of the process 70 of FIG. 5 or block 81 of the process 80 of FIG. 6. These steps (block 71, 81) may use DNN to improve the implementation of various section-based or link-based margin estimation algorithms. Based on the processes 70, 80 of FIGS. 5 and 6 described above, other specific algorithms may also be provided, as described with respect to FIGS. 7 and 8 below.

Figure 7:
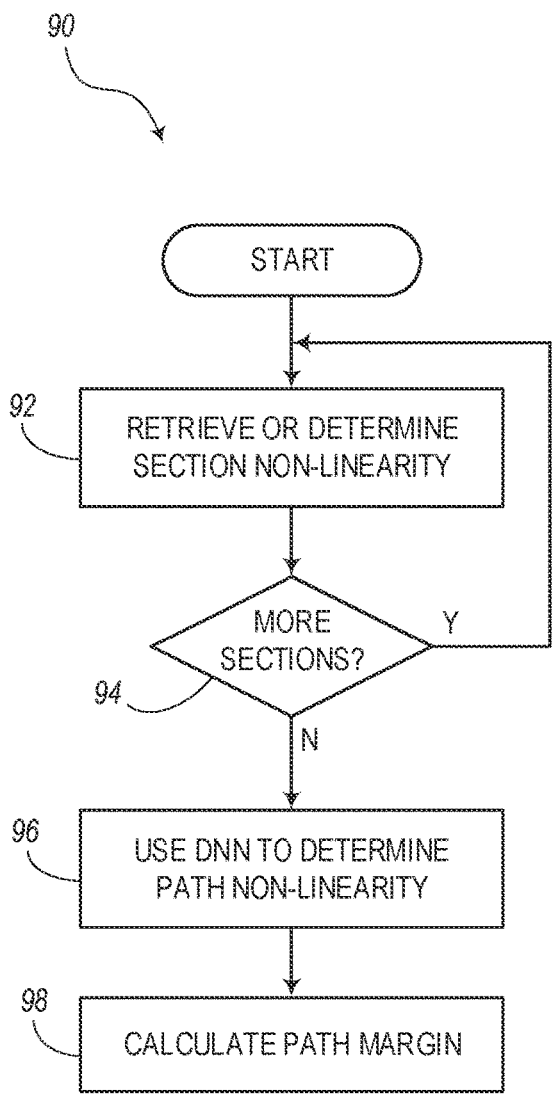
FIG. 7 is a flow diagram illustrating a first process for estimating margin in a path of an optical network, according to various embodiments.

FIG. 7 is a flow diagram illustrating an embodiment of a process 90 for estimating margin in a path of an optical network using direct path margin estimation. In this embodiment, the process 90 includes a step of retrieving or determining a non-linearity for a first (or next) section, as indicated in block 92. The process 90 also includes determining if the path includes more sections, as indicated in decision diamond 94. If so, the process 90 loops back to block 92 to retrieve or determine the non-linearity for the next section. After the non-linearities for all the sections of the path have been retrieved or determined, the process 90 proceeds from the decision diamond 94 to block 96. As indicated in block 96, the process 90 includes using DNN to determine a path non-linearity. Then, the process 90 includes the step of calculating the path margin, as indicated in block 98.

Figure 8:
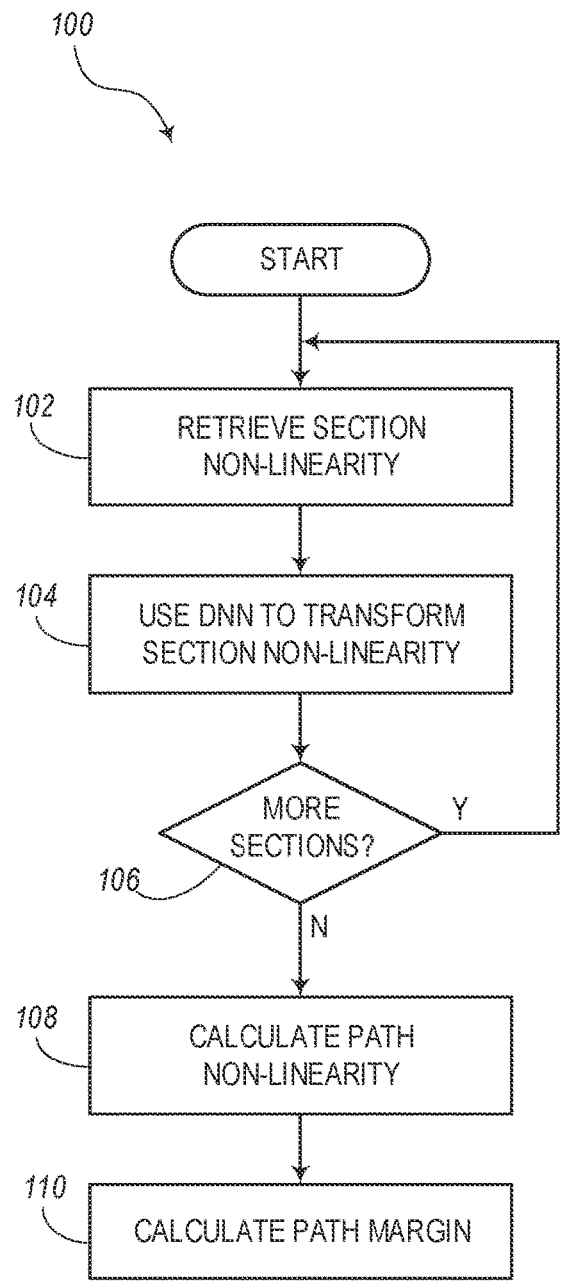
FIG. 8 is a flow diagram illustrating a second process for estimating margin in a path of an optical network, according to various embodiments.

FIG. 8 is a flow diagram illustrating an embodiment of another process 100 for estimating margin in a path of an optical network using two-step path margin estimation. In this embodiment, the process 100 includes a step of retrieving a non-linearity for a first (or next) section, as indicated in block 102. The process 100 also includes using DNN to transform the section non-linearity, as indicated in block 104. Decision diamond 106 includes determining whether or not the path includes any more sections (or links). If so, the process 100 loops back to block 102. However, the last section of the path has been reached, the process 100 moves ahead to block 108, which includes the step of calculating a path non-linearity. The process 100 further includes the step of calculating the path margin, as indicated in block 110.

The processes 90, 100 of FIGS. 7 and 8 may involve an approach that determines the section non-linearity in the context of a path. Then, end-to-end non-linearity can be calculated with another DNN which takes each section non-linearity as an input. For example, the non-linear Noise-to-Signal Ratio (NSR) expression may be approximated as follows:

$$NSR^{1:N}_{nl} \approx h_2(h_1(\{NSR^{n-1:n}_{nl}, x^{n-1:n}\}_{n=2}^{N}))$$

where $h_1$ and $h_2$ are two parametric functions, $x^{n-1:n}$ is the input feature vector of $h_1$ that characterizes section (n−1: n) and path information. This approximation may be similar to the section-based approach generalized above.

The process 90 of FIG. 7 may include an approach that only uses function $h_2$ to estimate the path non-linearity (e.g., block 96). As this function is implemented with a DNN, the process 90 can achieve the same performance as the other formulation, however it may be harder to train.

As shown in FIG. 8, each section goes through $h_1$ to generate adapted non-linearity (e.g., block 104). The function $h_1$ could produce a weight associated with each section non-linearity (e.g., as shown in FIG. 3), or may use any general function of non-linearity, such as, for example, using a DNN. The function $h_2$ (e.g., block 108) may be an aggregation function that takes all adapted section non-linearities and outputs path non-linearity. The use of $h_2$ may be a generalized form that is not limited by the weighted sum formulation described above with respect to FIG. 3. Instead, this function may be implemented with a DNN or a weighted sum. Experimental results may be based on weighted sum implementations according to FIG. 3.

According to the operating principles of the present disclosure, the various embodiments are configured to improve upon the conventional approaches by increasing the accuracy of margin estimation. For the first algorithm, the main principle that improves the performance is the use of a DNN. The DNN is able to approximate the relationship between its inputs and outputs and learns the relationship between segment configuration, its dispersion, and the non-linearity to be incurred on the segment. The DNN is also able to approximate this relationship when never-before-seen configurations are encountered through its generalization capabilities. For the second algorithm, the main principle that improves the performance is that it firstly uses the DNN approach to estimate margin quickly and accurately. In the case that the margin estimate does not meet certain acceptable guidelines, the algorithm may then invoke the more precise end-to-end simulation. In some respects, this approach may be considered to include the best of both worlds. When accurate estimates are possible, it uses the fast DNN approach. Otherwise, it may use the simulation approach. In this way, it is able to gain in speed without sacrificing accuracy.

In some embodiments, DNN may be used in the process of margin estimation in a situation when a micro-service architecture is implemented. If implemented as a micro-service, it may be possible to listen to REST/gRPC calls to the margin estimation service. DNN may be hosted inside an "inference" service, in which case it should be possible to examine the neural network to see the inputs. Without the micro-services architecture, a DNN can be detected by observing the libraries used by the program and possibly by replacing the DNN library with its debug/logging enabled version.

The combined algorithm can be detected in a system by measuring how long it takes to estimate margin. If a slow path simulation process and a fast section-based estimation process are both used, it may be possible to notice that some of the estimations may take a short time, while others may take a long while, which may lead to the conclusion that two different algorithms may have been combined.

The techniques, strategies, and algorithms described in the present disclosure may be added to various software products for improving the way in which OSNR margin is estimated. These embodiments are configured to perform better than baseline algorithms that are currently being implemented. The performance of the present embodiments was evaluated by calculating margin on paths in a large operational network. With the network topology the same and while the type of fiber used in the network was varied, the embodiments were studied to determine the effectiveness of the estimators. Actual path margin was also calculated using a path-based simulation, while the estimated margin was calculated using a section-based approach.

Figure 9:
FIG. 9 is a table illustrating some of the performance benefits of the systems and methods of the present disclosure.

FIG. 9 is a table 120 provided to show some of the performance benefits of the systems and methods of the present disclosure. For instance, the table 120 shows results for the pure and the mixed (fiber)-type network. In this example, there are 472 sections in the network and about 2700 multi-section paths through the network. The table 120 compares two section-based approaches. A "baseline" approach uses fixed weights (e.g., 1.0) to combine non-linearities, while a "DNN" approach uses weights that are calculated with a DNN, as described above, such as with respect to the first and second modules 48, 50 shown in FIG. 3. The gain in a Mean Absolute Error (MAE) may range from about 72% to about 87%. The MAE may be calculated only for the paths where the confidence of section-based estimation is in the acceptable range. Therefore, the table 120 shows how well the section-based estimation with a DNN works compared to conventional approaches.

Figure 10:
FIG. 10 is another table illustrating some benefits of the present systems and methods for showing a reduction in section simulations.

FIG. 10 is another table 130 provided to show some other benefits of the present systems and methods, particularly with respect to a reduction in simulations. The table 130 shows the reduction in complexity by the two algorithms. The reduction is calculated by how many fewer section evaluations are performed by the algorithm by avoiding path simulations. Path simulations occur if the algorithm determines that the section-base margin evaluation is of low quality and then runs the full path-based algorithm. As expected, due to increased accuracy, the DNN algorithm requires much fewer path simulations. The table 130 pertains to a hybrid algorithm and shows the improvement of the algorithm compared to a path-based approach, which does not use fast section-based estimation.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A computing system comprising:
   a network interface configured to obtain data from a plurality of sections forming a path through a network;
   a processing device in communication with the network interface; and
   a memory device configured to store a computer program having instructions that, when executed, enable the processing device to
   execute a section-based analysis by estimating a margin parameter for each section of the plurality of sections forming the path through the network, wherein the margin parameter is related to at least an available Optical Signal-to-Noise Ratio (OSNR) parameter and a Required OSNR (ROSNR) parameter, wherein estimating the margin parameter for each path includes determining a difference between the available OSNR parameter and at least the ROSNR parameter, wherein estimating the margin parameter for each path further includes subtracting a path penalty from the difference, and wherein the path penalty is a factor of one or more of filter characteristics, Polarization Dependent Loss (PDL), and Polarization Mode Dispersion (PMD), combine the estimated margin parameters for the plurality of sections to obtain a section-based estimate, and in response to determining that the section-based estimate falls outside an acceptable confidence range, execute an additional path-based analysis to modify the estimate of the margin parameter of the path.

2. The computing system of claim 1, wherein the network interface is configured to obtain at least one of measurements of non-linearities, configuration parameters, and fiber properties of each section of the plurality of sections forming the path through the network, and wherein executing the section-based analysis includes utilizing at least one of the measurements of non-linearities, the configuration parameters, and the fiber properties of the plurality of sections to estimate the margin parameter for each section.

3. The computing system of claim 2, wherein combining the estimated margin parameters includes applying a weight to each of the margin parameters and performing a summation function.

4. The computing system of claim 3, wherein the processing device is configured to use a Deep Neural Network (DNN) model or a Machine Learning (ML) regression model to calculate the weight associated with each of the plurality of sections.

5. The computing system of claim 3, wherein the processing device is configured to calculate the weight associated with each section of the plurality of sections based on at least one of a path dispersion before and after a respective section, a configuration of a respective section, pre-calculated non-linearities, fiber characteristics, modem type, spectral power, wavelength characteristics, and spectrum shape.

6. The computing system of claim 3, wherein the weight associated with each of the plurality of sections is different from weights of other sections.

7. The computing system of claim 1, wherein the sections are Optical Multiplex Sections (OMSs).

8. The computing system of claim 1, wherein the ROSNR parameter is an estimated ROSNR based on one or more of a maximum Bit Error Rate (BER) parameter and a Quality of Service (QoS) parameter.

9. The computing system of claim 1, wherein one or more of the section-based analysis or the path-based analysis includes using a Deep Neural Network (DNN) model.

10. A non-transitory computer-readable medium configured to store an Optical Signal-to-Noise Ratio (OSNR) margin estimator having instructions that, when executed, enable a processing device to:

execute a section-based analysis by estimating a margin parameter for each section of a plurality of sections forming a path through a network, wherein the margin parameter is related to at least an available OSNR parameter and a Required OSNR (ROSNR) parameter, wherein executing the section-based analysis includes utilizing at least one of measurements of non-linearities, configuration parameters, and fiber properties of the plurality of sections to estimate the margin parameter for each section;

combine the estimated margin parameters for the plurality of sections to obtain a section-based estimate, wherein combining the estimated margin parameters includes applying a weight to each of the margin parameters and performing a summation function;

use a Deep Neural Network (DNN) model or a Machine Learning (ML) regression model to calculate the weight associated with each of the plurality of sections; and in response to determining that the section-based estimate falls outside an acceptable confidence range, execute an additional path-based analysis to modify the estimate of the margin parameter of the path.

11. The non-transitory computer-readable medium of claim 10, wherein the instructions further enable the processing device to calculate the weight associated with each section of the plurality of sections based on at least one of a path dispersion before and after a respective section, a configuration of a respective section, pre-calculated non-linearities, fiber characteristics, modem type, spectral power, wavelength characteristics, and spectrum shape.

12. A method comprising the steps of:

executing a section-based analysis by estimating a margin parameter for each section of a plurality of sections forming a path through a network, wherein the margin parameter is related to at least an available Optical Signal-to-Noise Ratio (OSNR) parameter and a Required OSNR (ROSNR) parameter, wherein executing the section-based analysis includes utilizing at least one of measurements of non-linearities, configuration parameters, and fiber properties of the plurality of sections to estimate the margin parameter for each section, wherein the ROSNR parameter is based on one or more of a maximum Bit Error Rate (BER) parameter and a Quality of Service (QoS) parameter, and wherein one or more of the section-based analysis and the path-based analysis includes using a Deep Neural Network (DNN model);

combining the estimated margin parameters for the plurality of sections to obtain a section-based estimate, wherein combining the estimated margin parameters includes applying a weight to each of margin parameters and performing a summation function, wherein the weight associated with each section of the plurality of sections is based on at least one of a path dispersion before and after a respective section, a configuration of a respective section, pre-calculated non-linearities, fiber characteristics modem type spectral power, wavelength characteristics, and spectrum shape; and in response to determining that the section-based estimate falls outside an acceptable confidence range, executing an additional path-based analysis to modify the estimate of the margin parameter of the path.

13. The method of claim 12, wherein estimating the margin parameter includes determining a difference between the available OSNR parameter and the ROSNR parameter.

14. The method of claim 13, wherein estimating the margin parameter further includes subtracting a path penalty from the difference, and wherein the path penalty is a factor of one or more of filter characteristics, Polarization Dependent Loss (PDL), and Polarization Mode Dispersion (PMD).

* * * * *